(12) United States Patent
Finklea

(10) Patent No.: US 6,481,376 B1
(45) Date of Patent: Nov. 19, 2002

(54) WILD GAME GRAVITY FEEDER

(76) Inventor: Gavin Finklea, 1521 Mulberry St., Montgomery, AL (US) 36101

( * ) Notice: Subject to any disclaimer, the term of this patent is extended or adjusted under 35 U.S.C. 154(b) by 0 days.

(21) Appl. No.: 09/950,258

(22) Filed: Sep. 10, 2001

(51) Int. Cl.[7] .............................................. A01K 5/00
(52) U.S. Cl. .................................. 119/57.91; 119/51.01; 119/52.4
(58) Field of Search ..................... 119/57.91, 51.01, 119/52.1, 52.2, 52.4, 61

(56) References Cited

U.S. PATENT DOCUMENTS

| | | | | |
|---|---|---|---|---|
| 903,309 A | * | 11/1908 | Ottinger | 119/52.1 |
| 1,497,596 A | * | 6/1924 | Scott | 119/52.1 |
| 1,520,607 A | * | 12/1924 | Smith | 119/52.1 |
| 1,537,337 A | * | 5/1925 | De Angulo | 119/52.4 |
| 1,574,398 A | * | 2/1926 | Kisner | 119/51.15 |
| 2,131,984 A | * | 10/1938 | Stahmer | 119/57.91 |
| 2,153,455 A | * | 4/1939 | Casper et al. | 119/54 |
| 3,074,377 A | * | 1/1963 | Spencer | 119/52.1 |
| 3,730,139 A | * | 5/1973 | Moore | 119/429 |
| 4,057,136 A | * | 11/1977 | La Porte, Jr. | 119/57.91 |
| 4,242,985 A | | 1/1981 | Freeborn | |
| 4,582,023 A | * | 4/1986 | Zumbahlen et al. | 119/53.5 |
| 4,986,220 A | | 1/1991 | Reneau et al. | |
| 5,062,388 A | * | 11/1991 | Kilham | 119/52.2 |
| 5,143,289 A | * | 9/1992 | Gresham et al. | 119/51.11 |
| 5,233,941 A | * | 8/1993 | Ayliffe et al. | 119/57.91 |
| 5,463,980 A | * | 11/1995 | Rasmussen | 119/57.1 |
| 5,572,949 A | * | 11/1996 | Bryant et al. | 119/57.91 |
| 5,699,753 A | * | 12/1997 | Aldridge, III | 119/52.1 |
| 5,794,561 A | | 8/1998 | Schulz | |
| D398,424 S | | 9/1998 | Wenstrand | |
| 5,819,687 A | | 10/1998 | Lister | |
| 6,199,509 B1 | | 3/2001 | Mostyn et al. | |

* cited by examiner

*Primary Examiner*—Yvonne R. Abbott
(74) *Attorney, Agent, or Firm*—Lanier Ford Shaver & Payne, P.C.; Gerald M. Walsh

(57) ABSTRACT

A wild game feeder which channels feed to feed ports through channels in an insert. The game feeder has a feed chamber with a flared base, preferably conical. An insert, fits reversibly into the flared base. When feed is added to the feed chamber the insert distributes the feed evenly in the flared base and directs the feed uniformly through channels by gravity to the feed ports in the base. As the feed spills from the feed ports to the ground, the feed accumulates at the feed ports so as to prevent further spillage until an animal consumes the feed. The flared contour of the base prevents deer from injuring their growing antlers on the feed chamber as they feed.

3 Claims, 3 Drawing Sheets

WILD GAME GRAVITY FEEDER

BACKGROUND OF INVENTION

1. Field of the Invention

The present invention relates to wild game feeding devices and more particularly to a wild game gravity feeder with a flared base having a base insert feed distributor.

2. Technical Background

Wild game feeders are useful in promoting animal populations and attracting wildlife for observation or recreational hunting. Several types of feeders are known. One type uses motors and timers, which requires undo maintenance and expense. Another type is suspended from tripod supports. Early growing antlers can be damaged by the supports as deer attempt to feed. Gravity type feeders require chutes or baffles within the food compartment which can decrease the capacity of food held in the compartment and may require complex construction. Also, many feeders use troughs which cause feed to accumulate and become spoiled, or use food ports which become clogged.

The present invention provides a wild game feeder which sits on the ground, has a high feed capacity, eliminates antler contact with the food chamber, minimizes exposure of the feed to the environment, and is simple to construct and maintain and provides a more readily available food source for all wild game, promoting growth, health, and development.

SUMMARY OF THE INVENTION

The game feeder of the present invention has a feed chamber with a flared base which sits on the ground. The flared base has feed ports positioned above the level of the ground preventing moisture from accumulating in the feed chamber. Because the base is flared with a cone shape, the feed ports are positioned away from the feed chamber, allowing a deer to feed without the deer's antlers contacting the feed chamber. Feed is uniformly distributed to the feed ports by an insert. The insert has channels which distribute the feed and is inserted reversibly into the flared base. When feed is placed into the feed chamber, the feed is distributed uniformly to each feed port by each channel which communicates with the feed port. Feed will spill continuously out of the feed port onto the ground until the level of feed on the ground accumulates to the level of the feed port. When an animal eats the feed on the ground so that the feed level falls below the level of the feed port, the feed will again spill to the ground replacing the feed eaten by the animal.

An advantage of the present invention is to provide a game feeder with no chutes or baffles in the feed chamber.

Another advantage of the present invention is to provide a game feeder of simple and inexpensive construction.

Another advantage of the present invention is to provide a game feeder with a flared base to stabilize the feeder and to prevent deer from injuring their antlers on the feed chamber.

Another advantage of the present invention is to provide an insert to fit reversibly into the flared base to uniformly distribute the feed in the flared base and to uniformly channel the feed to the feed ports.

Another advantage of the present invention is to provide a game feeder that produces a minimum exposure of the feed to the environment.

Another advantage of the present invention is to provide a game feeder that keeps the feed supply above the ground preventing moisture from accumulating in the feed chamber.

Another advantage of the present invention is to provide a game feeder that prevents the feed ports from clogging.

DETAILED DESCRIPTION OF THE PREFERRED EMBODIMENTS

Figure 1:
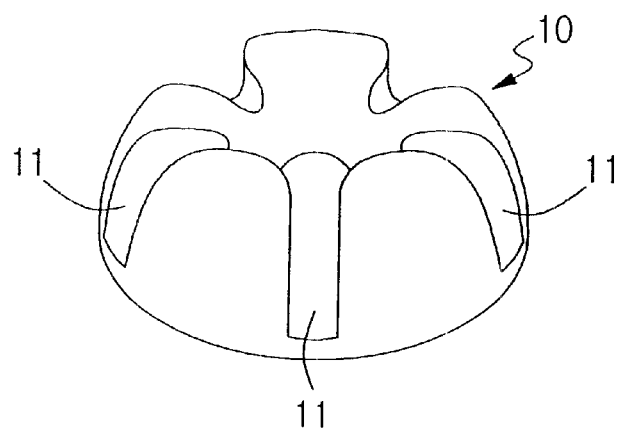
FIG. 1 shows a perspective view of the insert of the present inventions.

FIG. 1 shows a perspective view of the insert 10 of the present invention. The insert 10 has one or more channels 11, preferably four to six, evenly positioned on the insert 10.

Figure 2:
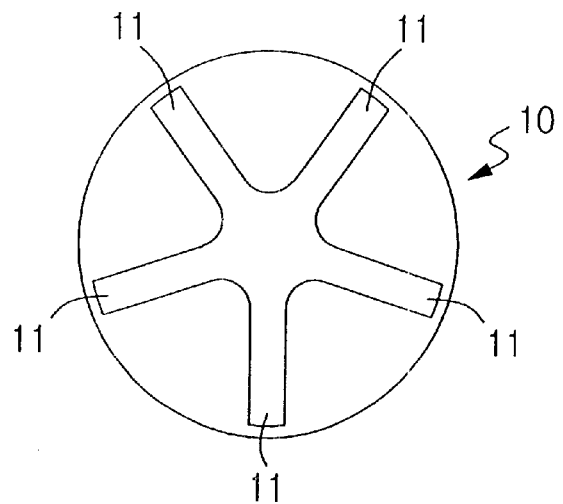
FIG. 2 shows a top view of the insert of the present invention.

FIG. 2 shows a top view of insert 10 with the evenly positioned channels 11.

Figure 3:
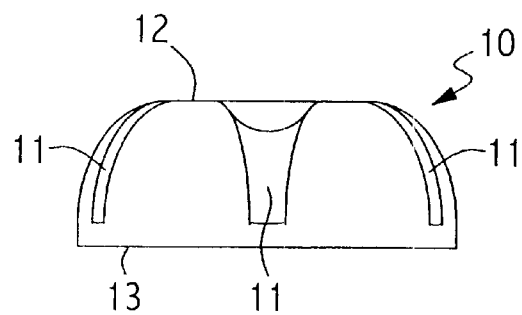
FIG. 3 shows a side view of the insert of the present invention.

FIG. 3 shows a side view of insert 10 with channels 11 that form grooves in insert 10 extending from the top 12 to up to 11 inches from the bottom 13 of insert 10, (i.e. from the ground), preferably 1.5 inches. The height of insert 10 from top 12 to bottom 13 is about 4 to 20 inches preferably about 12 inches. The shape of insert 10 is, preferably, cylindrical, having a diameter of about 8 to 96 inches, preferably about 45 inches.

Figure 4:
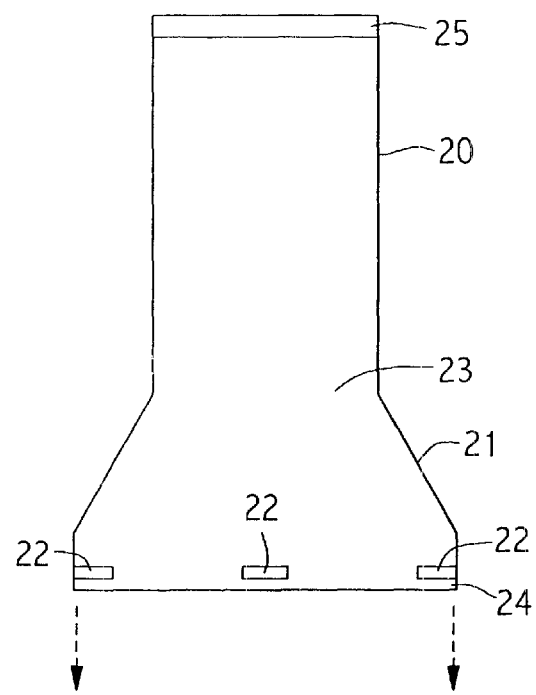
FIG. 4 shows the feed chamber and flared base of the present invention.
Figure 4:
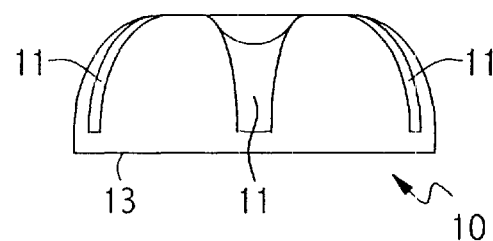

FIG. 4 shows feed chamber 20 having a flared base 21. The flared base 21 is shown positioned above insert 10. The contours of flared base 21 match the contours of insert 10 so that flared base 21 can be lowered down over insert 10. The shape of feed chamber 20) is, preferably, cylindrical, being about 18 to 60 inches in height, preferably about 34 inches, having a diameter of about 9 to 45 inches, preferably about 24 inches. Flared base 21 is, preferably, conical in shape. The maximum height of flared base 21 is about 12 to 48 inches, preferably about 20 inches. Flared base 21 has a top portion 23 and a bottom portion 24. Top portion 23 is attached reversibly or fixedly to feed chamber 20. The diameter of top portion 23 is similar to the diameter of feed chamber 20. The diameter of bottom portion 24 is about 18 to 96 inches, preferably about 45 inches. Bottom portion 24 has one or more feed ports 22, preferably four to six feed ports 22. Feed ports 22 are about 1 to 10 inches wide, preferably about 4 inches, and about 1 to 11 inches in height, preferably about 2 inches. The volume capacity of feed chamber 20 is about 0.25 to 100 gallons, preferably about 50 gallons. The smaller volume capacities render the feeder suitable for bird feeding.

Figure 5:
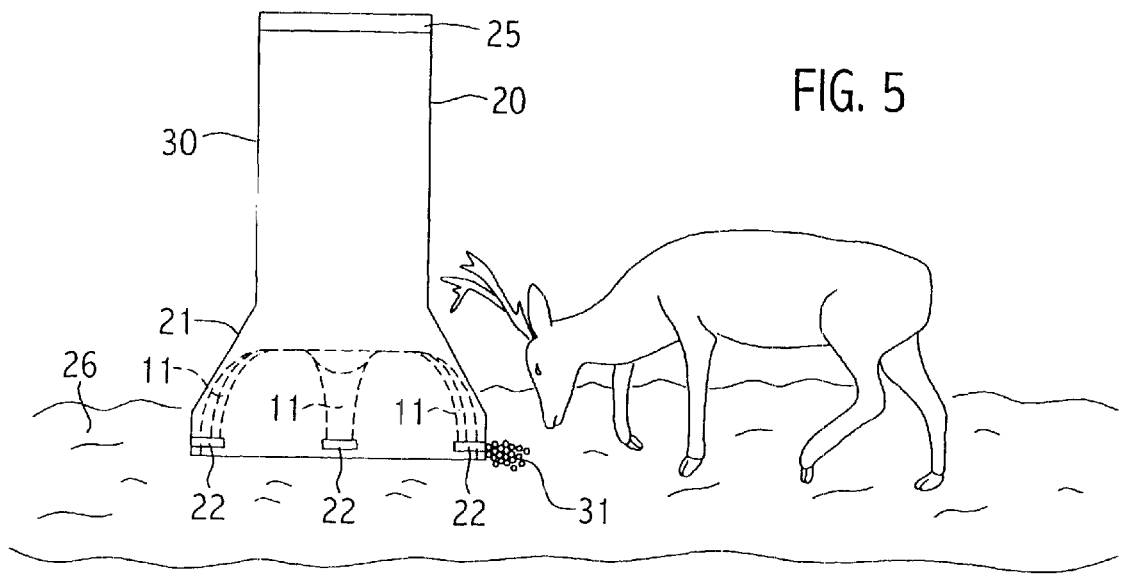
FIG. 5 shows the insert inserted into the flared base.

FIG. 5 shows flared base 21 positioned over insert 10 to form the game feeder 30 of the present invention. Insert 10 and bottom portion 24 of flared base 21 rest on the ground 26. Feed chamber 20 also can have a lid 25 to protect the feed from the environment. Feed ports 22 are positioned on flared base 21 about 1 to 11 inches above the ground, preferably about 2 inches. Because base 21 is flared, game feeder 30 does not need legs for support and animals, such as deer, can feed at feed ports 22 without the risk of damaging their antlers during their growth phase. There is no need to provide baffles or chutes in the feed chamber 20 to guide, distribute, and/or channel the feed to the feed ports 22 because insert 10 in flared base 21 will perform these functions.

Figure 6:
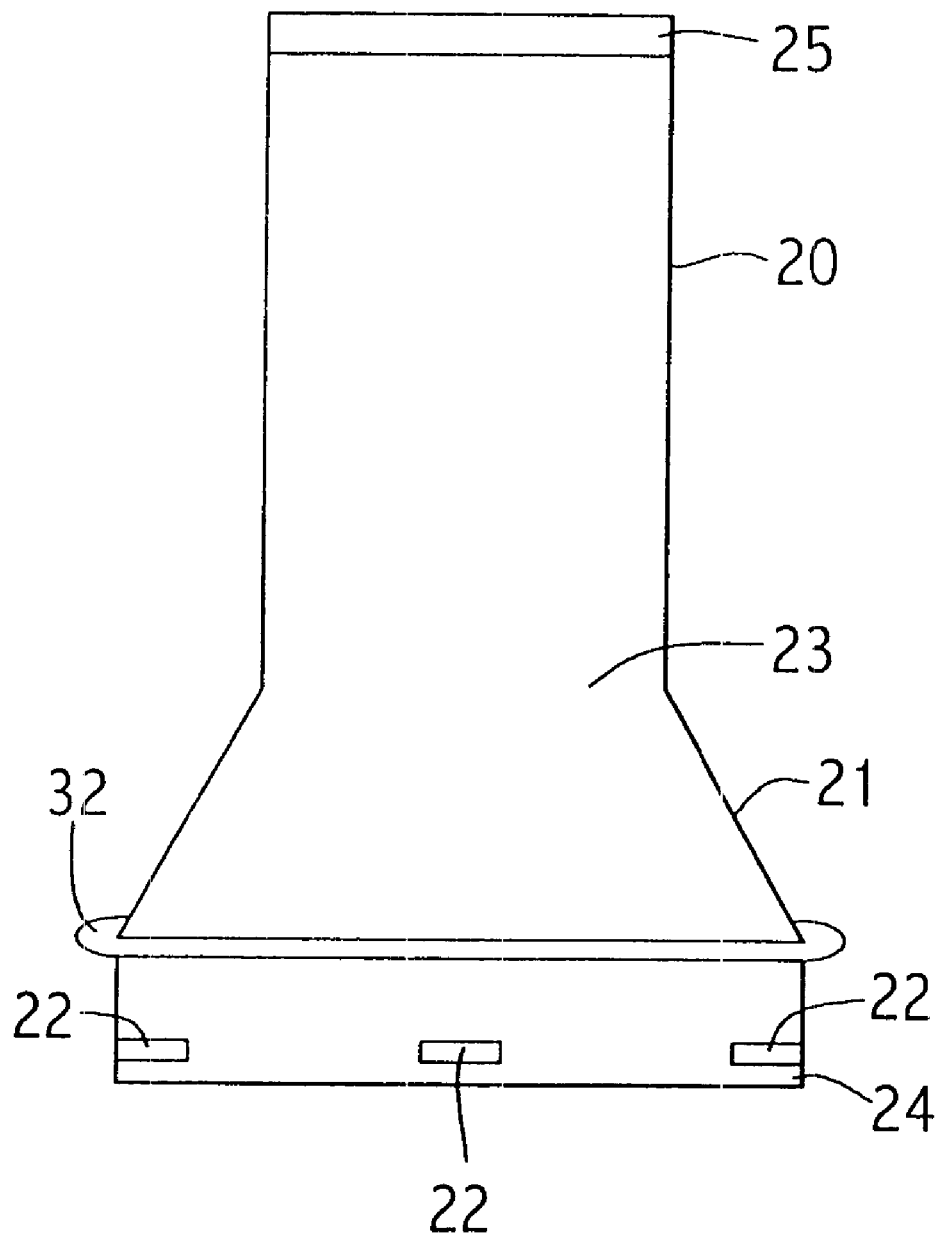
FIG. 6 shows an alternate embodiment of the feeding chamber having a drip guard.

FIG. 6 shows an alternate embodiment of feeding chamber 20 which has a drip guard 32. The drip guard 32 will prevent rain from dripping down the sides of flared base 21 and contacting feed 31.

Game Feeder 30 can be used by simply inserting insert 10 into flared base 21, aligning channels 11 with feed ports 22, and filling feed chamber 20 with any suitable feed. Insert 10 will then distribute the feed uniformly to channels 11 and channels 11 will uniformly channel the feed to feed ports 22 by gravity. Feed 31 will flow or spill out of feed ports 22 onto the ground 26 and will accumulate or pile up until it reaches the openings of feed ports 22. This accumulation will automatically stop the flow of feed 31 until an animal consumes the feed 31 to a level below the openings of feed ports 22. Flow of feed 31 will then again resume. A relatively small amount of feed 31 will flow out ports 22 so relatively little amounts of feed are exposed directly to the environment, thereby limiting the amounts of food damaged or spoiled by environmental factors and also preventing clogging of the feed ports 22. The game feeder 30 can be disassembled and cleaned easily because there are only two key elements: the feed chamber 20 with the flared base 21 and the insert 10. Likewise, the game feeder 30 is easy and inexpensive to manufacture.

Although this aspect of the invention has been described with respect to the embodiment illustrated in FIGS. 1–5, various alternatives may be used without departing from the scope of the invention. For example, the game feeder may be constructed of plastic, metal, or wood, or a combination thereof The game feeder may be constructed in any shape desired and can be camouflaged. It will be understood that various changes in the details, materials, and arrangements of the parts which have been described and illustrated above in order to explain the nature of this invention may be made by those skilled in the art without departing from the principle and scope of the invention as recited in the following claims.

I claim:

1. A method for feeding game, comprising:
   a) providing a chamber having a flared base with one or more feed ports;
   b) filling said chamber with feed; and
   c) channeling the feed in said flared base uniformly to said feed ports so that feed spills from said feed ports to the ground until the feed on the ground accumulates to the level of said feed ports, and so that feed will begin to spill to the ground when the level of the feed on the ground falls below the level of said feed ports.

2. The method according to claim 1 wherein said channeling the feed is performed by an insert inserted reversibly into said flared base.

3. The method according to claim 2 wherein said insert has channels which uniformly distribute the feed to said feed ports by gravity.

* * * * *